June 23, 1925. 1,543,044
J. A. ANGLADA
MOTOR MOUNTING AND POWER TRANSMISSION MECHANISM FOR MOTOR VEHICLES
Filed March 16, 1922
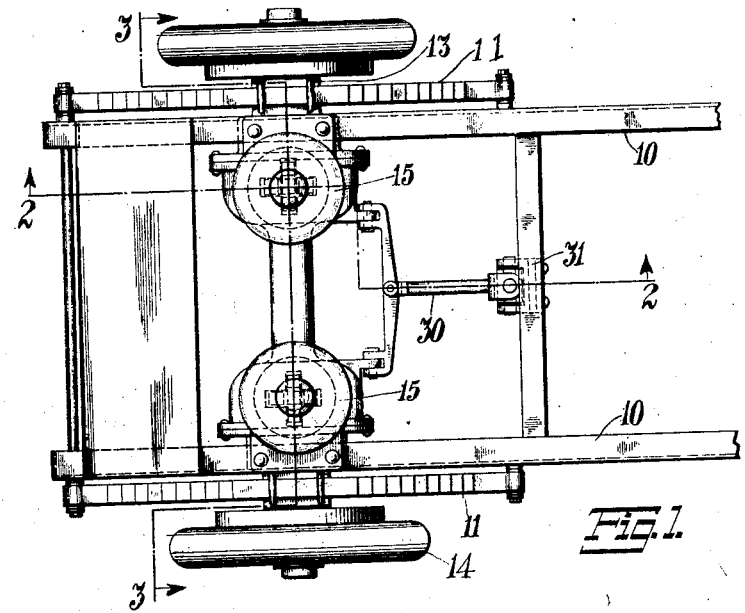
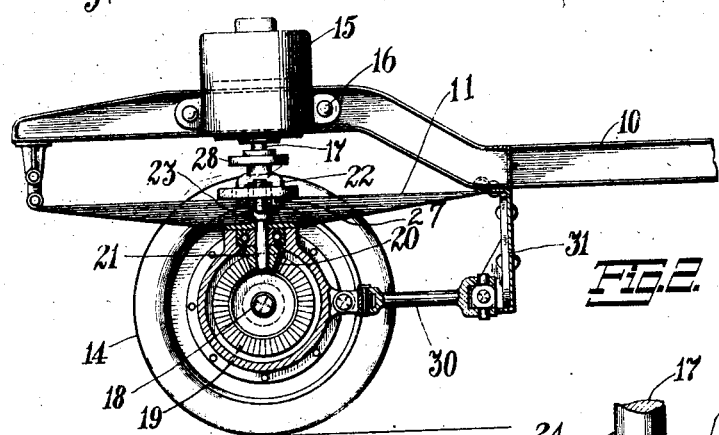
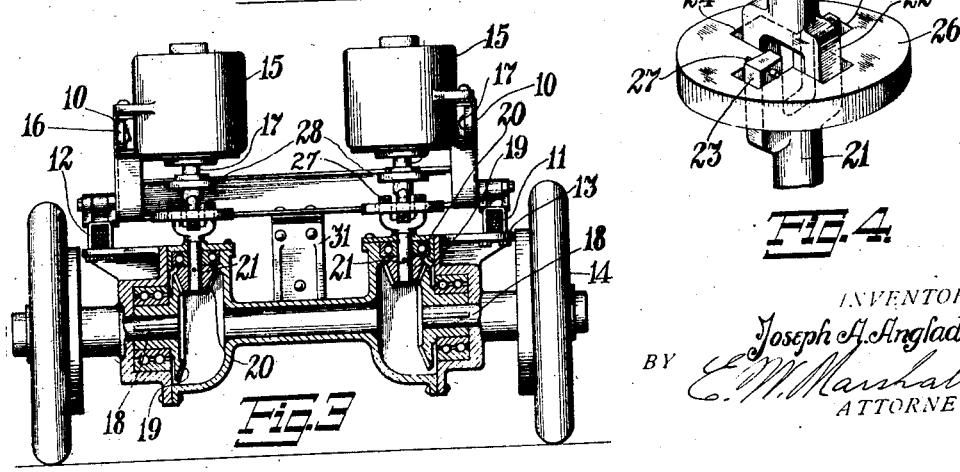
INVENTOR
Joseph A. Anglada
BY E. M. Marshall
ATTORNEY Patented June 23, 1925.

1,543,044

UNITED STATES PATENT OFFICE.

JOSEPH A. ANGLADA, OF JENKINTOWN, PENNSYLVANIA, ASSIGNOR TO ELECTROCAR CORPORATION, OF NEW YORK, N. Y., A CORPORATION OF DELAWARE.

MOTOR MOUNTING AND POWER-TRANSMISSION MECHANISM FOR MOTOR VEHICLES.

Application filed March 16, 1922. Serial No. 544,351.

*To all whom it may concern:*

Be it known that I, JOSEPH A. ANGLADA, a citizen of the United States, and a resident of Jenkintown, county of Montgomery, and State of Pennsylvania, have invented certain new and useful Improvements in Motor Mountings and Power-Transmission Mechanisms for Motor Vehicles, of which the following is a specification.

This invention relates to motor vehicles and more particularly to electrically driven motor vehicles and to the motor mounting and power transmission mechanism.

One of the objects of the invention is to provide a flexible drive from the motors to the wheels constructed and arranged to permit a wide range of the movement of the rear axle and housing with respect to the frame and motor.

Another object of the invention is to provide a drive from the motors to the wheels arranged to permit vertical, lateral and twisting movement of the rear axle with respect to the motors and frame without interfering with the power transmission.

Further objects of the invention will appear from the following specification taken in connection with the drawings which form a part of this application and in which Fig. 1 is a top plan view of a portion of the rear end of a motor vehicle chassis having motors and power transmission mechanism constructed in accordance with the invention.

Fig. 2 is a sectional elevation taken through the rear axle and showing in section the power transmission mechanism between a motor and one end of the rear axle.

Fig. 3 is a longitudinal sectional elevation of the rear axle taken substantially on line 3—3 of Fig. 1, and Fig. 4 is a perspective view showing the universal joint used for transmitting power from the motor shaft to the gearing for driving the wheel axle.

In the particular embodiment of the invention shown each drive wheel is driven from a separate motor and each of the motors is rigidly mounted on the vehicle frame. The power transmission mechanism between the motor shaft and the wheel comprises gearing for connecting an intermediate shaft to the wheel axle and a flexible drive between the intermediate shaft and the motor shaft. This flexible drive is so constructed and arranged as to permit vertical and twisting movement of the rear axle with respect to the motor and frame and the drive also permits a limited amount of lateral and longitudinal movement between these parts.

Referring to the drawings, I have shown a portion of the rear end of a frame 10 of a motor vehicle chassis to which is secured a pair of springs 11. The springs 11 are clamped as shown at 12 to flanges 13 formed on the rear axle housing.

Each of the wheels 14 is driven from a separate motor 15 and the motors 15 are rigidly clamped as shown at 16 to the main frame 10 of the vehicle. As illustrated these motors are mounted vertically and are disposed above the rear axle and the motor shafts 17 are disposed in the plane of the axis of the rear axle and wheel shafts 18.

Each wheel axle 18 has secured thereto a gear 19 which meshes with a gear 20 carried by an intermediate shaft 21.

In order to permit the rear axle and wheels to rise and fall and to twist or rotate on an axis longitudinal of the vehicle frame, I have provided a universal joint connection between each of the shafts 21 and the corresponding shafts 17.

This universal joint connection comprises a bifurcated or forked end 22 formed on motor shaft 17 and the corresponding bifurcated or forked end 23 formed on the upper end of the intermediate shaft 21. These bifurcated ends 22 and 23 are disposed in slots or openings 24 and 25 respectively formed in a power transmitting disc 26 and from the showing in Fig. 4, it will be noted that the slots 24 and 25 are disposed at right angles to each other and intersect at the center of the disc. It will also be noted that the slots 24 and 25 are so dimensioned with respect to the bifurcated ends that each of these ends may move laterally in its slot and also may swing in the slot. The bifurcated ends 23 are provided with pins 27 adjacent their upper ends to retain the parts in assembled position. From this description it will be understood that relative vertical movement between the shafts 17 and 21 is permitted and also that the shafts may move angularly with reference to each other and to a limited extent may move laterally.

If desired a coupling 28 may be provided in each of the shafts 17. I have also shown a radius rod connection 30 to the rear axle and to a bracket 31 secured to the main frame for the purpose of directing the relative movement between the rear axle and frame and for transmitting the propelling effort from the rear axle to the vehicle frame.

From the above specification it will be seen that a simple, practical and efficient power transmission mechanism or drive has been provided between the motors and rear axle and that this drive will permit a wide range of movement of the rear axle with respect to the motors and vehicle frame.

Although one specific embodiment of the invention has been illustrated and described, it will be understood that the invention is capable of modification and that changes in the construction and in the arrangement of the various cooperating parts may be made without departing from the spirit or scope of the invention as expressed in the following claim.

What I claim is:

In a motor vehicle, a frame, a transverse axle housing, a pair of drive wheels supported thereby, springs between the frame and the axle housing, a pair of motors on the frame above the axle housing, independent transmission mechanism between each motor and one of the wheels each comprising a telescopic connection and a universal joint, a radius rod, a universal joint between one end of said rod and the vehicle frame, and a cross bar pivotally connected near its ends with the axle housing, and near its center with the radius rod.

In witness whereof, I have hereunto set my hand this 21st day of February, 1922.

JOSEPH A. ANGLADA.